Oct. 11, 1955      E. B. HOLUM      2,720,121
DUAL DRIVER CONTROL MECHANISM FOR AUTOMOBILES
Filed Sept. 29, 1952      5 Sheets-Sheet 1
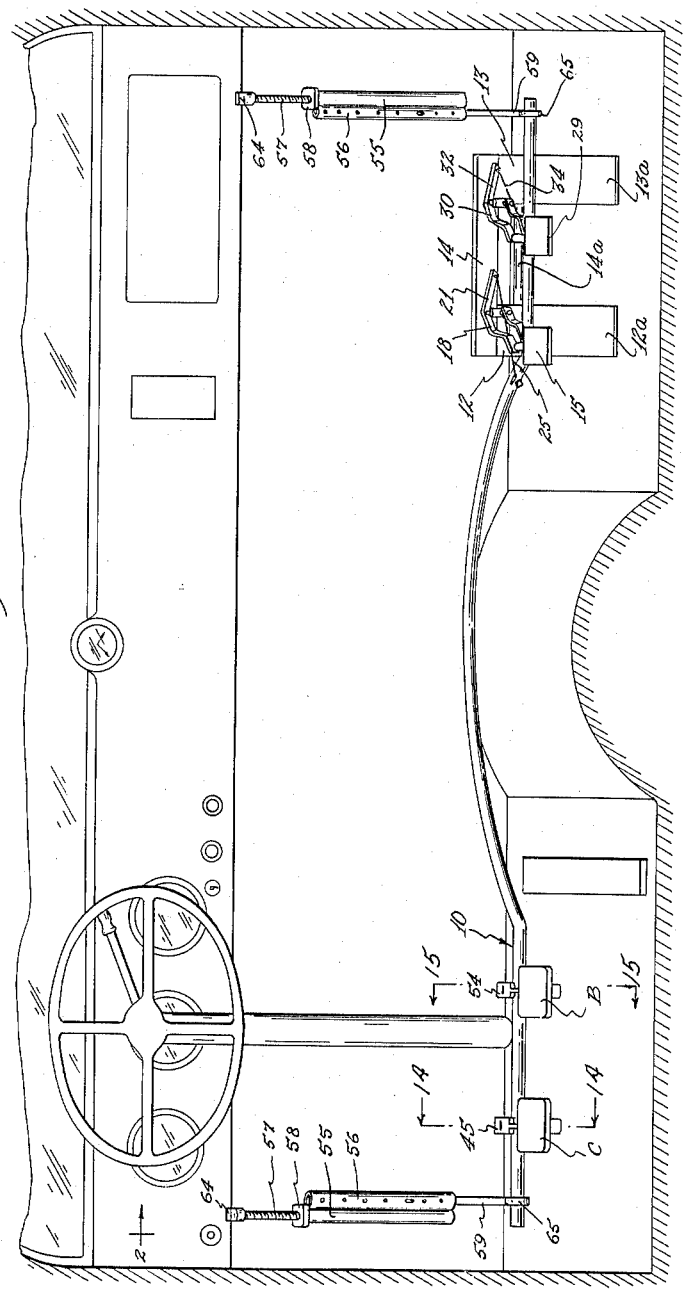
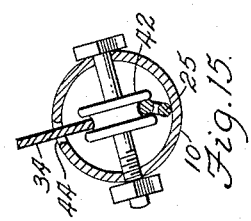
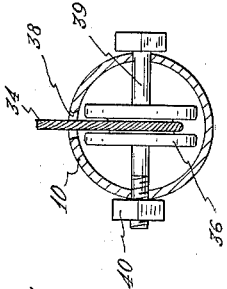
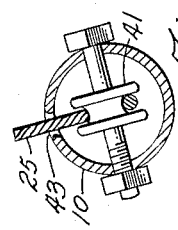
INVENTOR.
Edwin B. Holum
BY
Greek Wells Atty.

Oct. 11, 1955      E. B. HOLUM      2,720,121
DUAL DRIVER CONTROL MECHANISM FOR AUTOMOBILES
Filed Sept. 29, 1952      5 Sheets-Sheet 2

INVENTOR.
Edwin B. Holum
BY

Oct. 11, 1955   E. B. HOLUM   2,720,121
DUAL DRIVER CONTROL MECHANISM FOR AUTOMOBILES
Filed Sept. 29, 1952   5 Sheets-Sheet 3

INVENTOR.
Edwin B Holum
BY
Greek Wells Atty

Oct. 11, 1955  E. B. HOLUM  2,720,121
DUAL DRIVER CONTROL MECHANISM FOR AUTOMOBILES
Filed Sept. 29, 1952  5 Sheets-Sheet 4
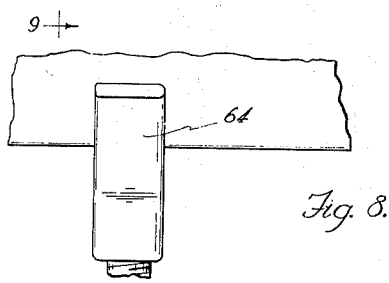
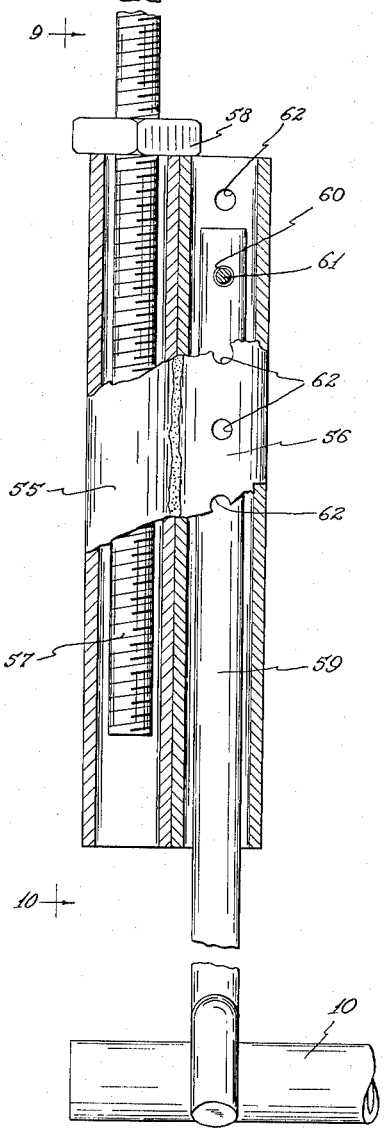
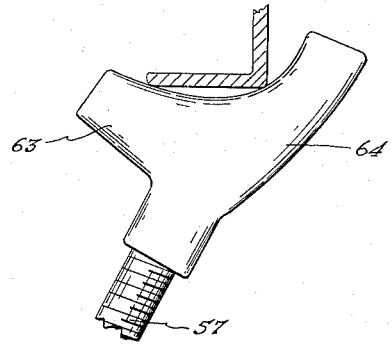
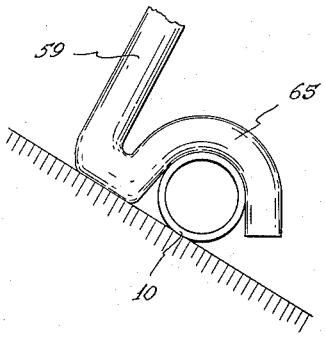
INVENTOR.
Edwin B. Holum Oct. 11, 1955     E. B. HOLUM     2,720,121
DUAL DRIVER CONTROL MECHANISM FOR AUTOMOBILES
Filed Sept. 29, 1952     5 Sheets-Sheet 5

INVENTOR.
Edwin B. Holum
BY
Brickwells Atty

United States Patent Office 2,720,121
Patented Oct. 11, 1955

2,720,121

DUAL DRIVER CONTROL MECHANISM FOR AUTOMOBILES

Edwin B. Holum, Spokane, Wash., assignor of one-fourth to H. Ray Jenkins, one-fourth to John Stantus, and one-fourth to B. E. Toth, Spokane, Wash.

Application September 29, 1952, Serial No. 311,988

8 Claims. (Cl. 74—480)

The present invention relates to improvements in a dual driver control mechanism for automobiles.

It is the principal purpose of the invention to provide a novel dual driver control mechanism which may be quickly attached to any present day automobile.

It is a further purpose of the invention to provide a mechanism comprising both an auxiliary clutch pedal and an auxiliary brake pedal which can be quickly and easily attached to an automobile without the necessity of mutilating the automobile by drilling any holes or attaching any support members to it.

The improved dual driver control mechanism is merely placed on the floor of the car between the operating controls and the fire wall and held there by two jacks which press against the floor of the car and the lower edge of the dash board.

It is believed that the nature and advantages of the invention will appear more fully from the following description and the accompanying drawings. The description and drawings are illustrative only and are not intended to limit the invention except insofar as it is limited by the claims.

In the drawings:

Figure 1 is a view looking into the front portion of the interior of an automobile equipped with the invention;

Figure 7 is a fragmentary sectional view taken on the line 7—7 of Figure 3;

Figure 8 is a fragmentary sectional view of one of the jacks employed in the invention;

Figure 9 is a fragmentary view taken on the line 9—9 of Figure 8;

Figure 10 is a fragmentary view taken on the line 10—10 of Figure 8;

Figure 11:
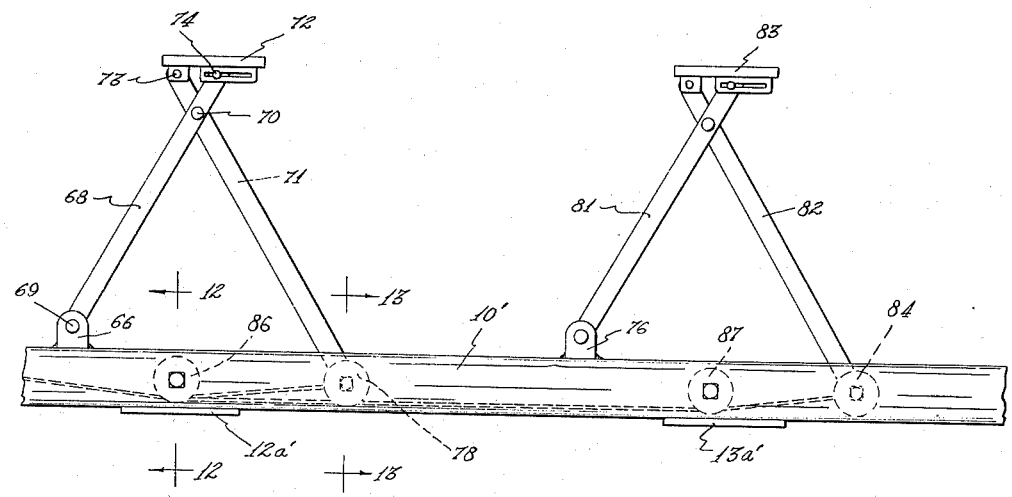
Figure 11 is a view showing a modified form of the invention.
Figure 13:
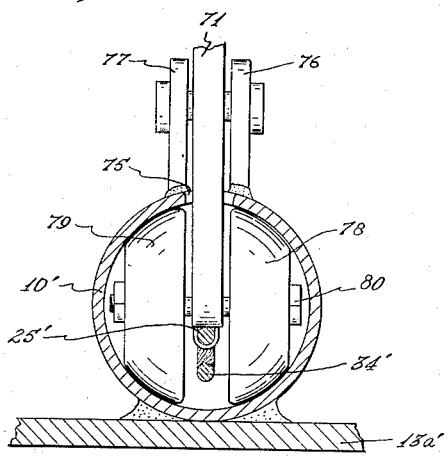

Figure 13 is a fragmentary sectional view taken on the line 13—13 of Figure 11; and Figures 14 and 15 are fragmentary sections similar to Figure 7 taken substantially on the lines 14—14 and 15—15 of Figure 1.

The invention comprises a supporting and spacing mechanism, the main frame of which is a rigid hollow guide. The guide in its simplest form is a pipe having an auxiliary clutch mechanism and an auxiliary brake mechanism at its right end. Cables attached to the auxiliary clutch and brake mechanisms pass into the pipe near its right end, travel through the pipe to points near the left end and at those points leave the pipe. Each cable has, at its free end, a clamp adapted to clamp onto the true pedal of the automobile. Two jacks are used to secure the device to the floor of the car. The jacks press against the pipe on the floor and the under portion of the dashboard, thus holding the pipe without mutilating the automobile in any way.

The pipe 10 which forms the main frame of the device is slightly shorter in length than the distance across the front floor portion of an automobile. The pipe 10 has a raised portion 11 at its center so that the portion 11 may ride over the hump in the center of the floor caused by the transmission case of the car. Near the right hand side of the pipe 10, two upright bars 12 and 13 are mounted. The bars 12 and 13 are joined at their upper ends by a cross bar 14, which carries the auxiliary clutch and brake mechanisms. In order to keep the device in a position such that the frame 12—13—14 will be perpendicular to the portion of the floor on which it is seated, the two bars 12 and 13 are bent around the pipe 10 and extended rearwardly to provide arms 12a and 13a which form a base. A pipe 14a is welded to the bars 12 and 13 in front of the pipe 10 and directly opposite the arms 12a and 13a to keep the device from tipping toward the front of the car.

It is believed that a detailed description of the auxiliary clutch mechanism will suffice both for itself and for the accompanying brake mechanism since the two are identical in structure and operation.

The auxiliary clutch pedal 15 is welded to a sleeve 16, surrounding a stub shaft 17. The stub shaft 17 is mounted on one end of a lever arm 18. The arm 18 is pivoted at 19 on a pin 20 which is mounted on the crossbar 14. The pin 20 has a threaded portion which extends through the crossbar 14 and has a nut threaded on its end. The lever arm 18 is bent at about a right angle at the pivot 19 to provide another arm 21. The arm 21 carries at its end a swivel pin 22 which is apertured to hold a bolt 23. This bolt 23 has an eye 24 through which a cable 25 is threaded. On the other side of the swivel pin 22 a nut is threaded on the bolt 23 so that the bolt may be adjusted to shorten or lengthen the cable 25.

In order to keep the clutch pedal 15 level as the arm 18 is rotated about the pin 20, a lever 26 is pivoted at one end to an ear 27 mounted on the sleeve 16 and at the other end to a link 28 carried by the pin 20. The link 28 is solidly mounted on the head portion of the pin 20, and extends downward therefrom. When the clutch pedal is forced downward, the arm 26 pivots around a lower point than the arm 18 and thus maintains the clutch pedal substantially horizontal.

The auxiliary brake pedal 29, is carried by an arm 30, pivoted at 31 in the same manner as the clutch pedal 15. The arm 30 also has a portion 32 extending at about a right angle to the arm 30 which carries a cable mount 33. A brake cable 34 is attached to the arm 32 in the same fashion as the cable 25 is attached to the arm 21.

The cables 25 and 34 are trained under two pulleys 35 and 36, set in the tubular pipe 10. The pipe 10 has slots 37 and 38 positioned above the pulleys 35 and 36 where the cables 25 and 34 enter the pipe 10.

The pulleys 35 and 36 (see Figure 7) are mounted in the pipe 10 by bolts 39 and nuts 40.

The cables 25 and 34 run through the pipe 10 to the left hand side where they are again trained respectively under the pulleys 41 and 42 similar to the pulleys 35 and 36. There are slots 43 and 44 in the pipe 10, through which the cables 25 and 34 pass. The pulley 41 and the slot 43 are positioned so that when the device is in an automobile they are directly in line with the clutch pedal C. In a like manner the pulley 42 and the slot 44 are directly in line with the brake pedal B.

Figure 5:
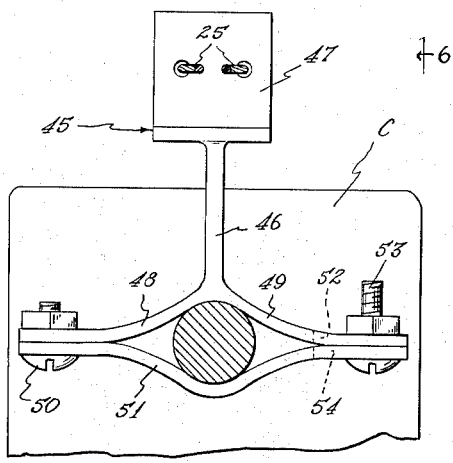
Figure 5 is a fragmentary sectional view taken on the line 5—5 of Figure 2.
Figure 6:
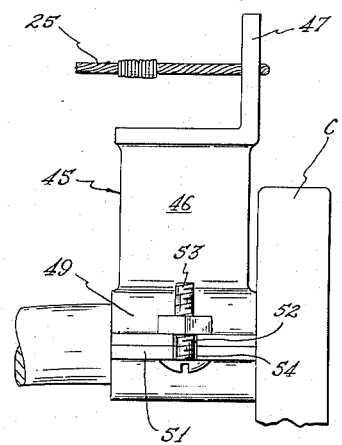
Figure 6 is a side view of Figure 5 looking in the direction of line 6—6 on Figure 5.
Figure 3:
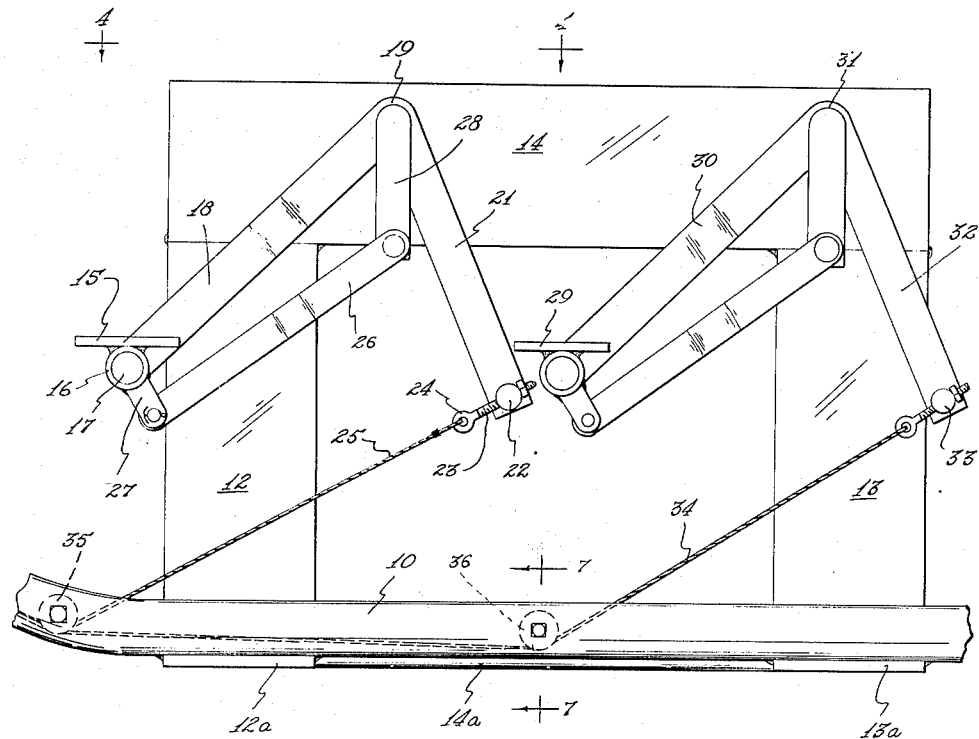
Figure 3 is a partial front elevation of the improved dual driver control mechanism showing the auxiliary clutch and brake mechanism.
Figure 4:
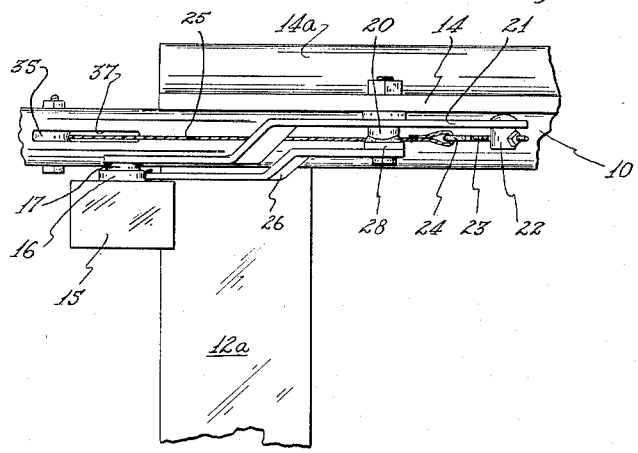
Figure 4 is a partial plan view of the auxiliary clutch and brake mechanism taken on the line 4—4 of Figure 3.

At the end of the cable 25, a clamp 45 is attached. The clamp 45 (shown in Figures 5 and 6) has an arm 46 extending down from the cable connecting portion 47. At its lower end the arm 46 is bifurcated to form two laterally extending portions 48 and 49. The portion 48 has an aperture near its outer end that receives a bolt 50, which serves to connect another bar 51. The bar 51 is bent out at its center to provide a pocket to receive the clutch shank. The portion 49 has a slot 52 at its outer end to receive a bolt 53 which also passes through a slot 54 in the end of the bar 51 opposite the bolt 50. In attaching the clamp to the clutch shank, the arm 46 is set on top of the shank so that the arms 48 and 49 extend laterally on either side of the shank. The bar 51 which is attached to the arm 48 by the bolt 50 is then swung under the shank and lined up so that the slot 52 on the arm 49 and the slot 54 on the arm 51 are opposite each other. The bolt 53 is then slid into the two slots and tightened down.

The cable 34 has, at its free end, a clamp 54 similar to the clamp 45 which is attached in a like manner to the brake pedal. The clamps 45 and 54 may of course be varied in size and structure to fit different model automobiles.

Figure 2:
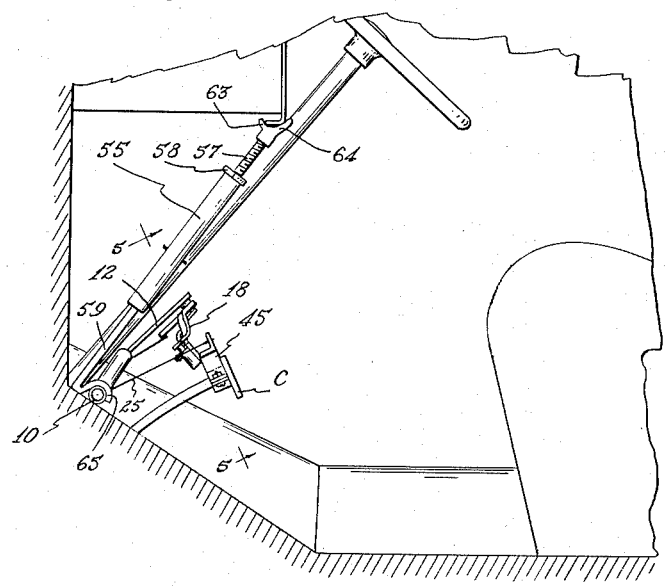
Figure 2 is a partial side view of the front portion of the interior of an automobile equipped with the invention, taken on the line 2—2 of Figure 1.

The jacks used to keep the pipe 10 and the attached mechanism in place are shown best in Figures 1, 2, and 8. Each jack is comprised of two pipes 55 and 56 which are welded side by side. The pipe 55 carries inside a threaded bar 57 which has a large nut 58 threaded thereon. The nut 58 seats at one end of the pipe 55. The pipe 56 has a bar 59 inside of it. The bar 59 has an aperture 60 at one end adapted to receive a pin 61. The pipe 56 has a plurality of holes 62 drilled laterally through it, adapted also to receive the pin 61. The pin 61 is run through the aperture 60 in the bar 59 and through one set of apertures 62 in the pipe 56, to hold the bar 59 at the desired position.

The bar 57 is bifurcated at its free end to form two jaws 63 and 64 which will fit around the bent under lip of the dashboard of an automobile. These jaws 63 and 64 may be rubber coated to keep from marring the finish of the dashboard. The bar 59 is bent at its free end to form a pocket 65 to receive the pipe 10 and press it against the floor of the automobile.

In attaching the dual control mechanism to an automobile, the jacks are first adjusted to the desired length by running the pin 61 through the bar 59 and one set of the holes 62 which will leave the desired length of the bar 59 protruding from the pipe section 56. The pocket 65 is then placed over the pipe 10 and the jaws 63 and 64 of the bar 57 are placed under the dashboard. When the nut 58 is tightened down, it forces the bar 57 farther out of the pipe 55 and clamps the jack securely against the dashboard and the pipe 10.

The operation of the device is very simple. When the auxiliary clutch pedal or brake pedal is pushed down, its corresponding lever arm 21 or 32 pulls its cable 25 or 34 farther out of the pipe 10. This action causes the cable 25 or 34 to be drawn into the pipe 10 at the left hand end, thus pulling the clamp 45 or 54 and the pedal to which it is attached down toward the floor. When the pressure on the auxiliary pedal is released, the spring return on the true pedal causes it to return to its normal position and pulls the auxiliary pedal up also.

Figure 12:
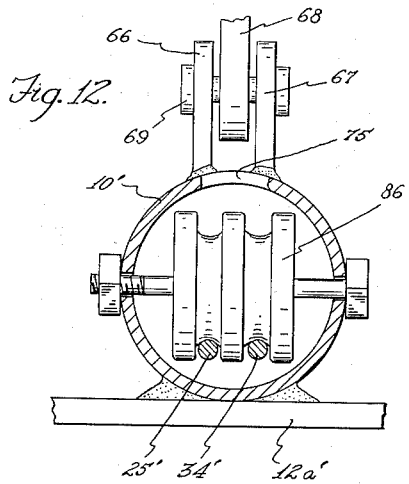
Figure 12 is a fragmentary sectional view taken on the line 12—12 of Figure 11.

In the modified form of the invention, shown in Figures 11, 12 and 13, a different auxiliary clutch and brake mechanism is used. Near the right hand side of the pipe 10' a pair of upstanding ears 66 and 67 are provided. A lever arm 68 is pivoted to the ears 66 and 67 by a pivot pin 69. The arm 68 is pivoted at 70 to a second lever arm 71. Above the pivot 70 a pedal 72 is mounted at 73 on the arm 71. The pedal 72 is slidably mounted at 74 to the arm 68 so that when the pedal 72 is depressed, it maintains a horizontal position throughout its travel. The lower end of the lever arm 71 enters the pipe 10" through a long slot 75. The slot 75 extends from the ears 66 and 67 to a similar set of ears 76 and 77 set on the pipe 10'. The distance between the ears 66 and 67 and the ears 76 and 77 is about one and three-quarters of the length of the arm 68.

Inside of the pipe 10' and attached to the lower end of the arm 71, a set of hemispherically shaped roller wheels 78 and 79 are positioned. A bolt 80 connects the two wheels together and to the arm 71. A cable 25" is also attached to the lower end of the arm 71.

Pivoted to the second pair of ears 76 and 77 is a lever arm 81 similar to the arm 68. The lever arm is pivoted near its upper end to an arm 82 and above the pivot a pedal 83 is mounted exactly like the pedal 72. A set of roller wheels 84 are mounted in the pipe 10' and connected to the arm 82 in the same manner as the wheels 78 and 79. A cable 34' is attached to the lower end of the arm 82 between the roller wheels 84. The second pedal mechanism is thus constructed in the same fashion as the first.

In the pipe 10', between the ears 66 and 67 and the roller wheels 78 and 79, a double pulley 86 is mounted. The cables 25' and 34' are each trained under this pulley. A single pulley 87 is mounted between the ears 76 and 77 and the roller wheels 84. This pulley is adapted to guide the cable 34', which runs from the lower end of the arm 82, under the pulley 87, between the rollers 78 and 79 and under one side of the pulley 86 to the left hand end of the pipe 10'. The cable 25' runs from the rollers 84 under the other side of the pulley 86 and also to the left hand end of the pipe 10'. The construction of the left hand end of the pipe 10' is the same as in the preferred form of the invention.

To operate the modified dual control mechanism, the operator merely depresses one of the pedals 72 or 83. This causes the levers 68 and 71 or 81 and 82 to diverge and pull the cable 25' or 34' through the pipe 10'. This of course pulls the corresponding true pedal down in the same manner as in the preferred form of the device.

It should be understood that devices of the nature described may be made with only one pedal and cable means for use in automobiles of the automatic transmission type.

The foregoing description defines a simple and effective dual control mechanism which is adapted to be used in present day automobiles. This device may be attached and removed easily and quickly and does not necessitate the use of permanently installing any braces or connections on the car itself.

The invention having thus been described, what is claimed as new is:

1. A dual driver control mechanism for automobiles comprising a hollow guide, flexible connectors passing through the length of the hollow guide, lever means mounted at one end of the hollow guide, pedal plates mounted on the lever means, one end of each flexible connector being attached to one lever means, the lever means adapted to pull the flexible connectors lengthwise of the hollow guide when the pedal plates are depressed, clamping means on the other ends of the flexible connectors for securing them to the clutch and brake pedals of the automobile, and means to secure the hollow guide to the floor of the automobile, said last named means comprising extensible jack members each having a tubular body, two bars being inside the body, each bar extending lengthwise from the body, one bar from the upper end and the other bar from the lower end, the upper bar threaded and having a nut threaded thereon outside of the body, said nut being seated against the upper end of the body and adapted to draw the threaded bar out of the body when the nut is threaded down the bar, said threaded bar having a head portion at its outer end adapted to seat against the dashboard of the automobile, the lower bar extending from the lower end of the body being connected to the body and having a foot portion at its lower end adapted to seat against the floor of the automobile, said foot portion having a pocket to seat the hollow guide against the floor and prevent said hollow guide from moving with respect to the floor.

2. A dual driver control mechanism for automobiles comprising a tubular hollow guide, a flexible connector passing through the length of the hollow guide, lever means mounted at one end of the hollow guide and connected to the flexible connectors, a pedal plate mounted on the lever means, said lever means adapted to pull the flexible connector lengthwise of the hollow guide when the pedal is depressed, means on the other end of the flexible connector to secure it to the brake pedal of the automobile, and means for securing the hollow guide to the floor of the automobile, said last named means comprising extensible jack members, said jack members each having a tubular body, two bars inside the body and extending lengthwise from each end of the body, one bar threaded and having a nut threaded on it outside of the body, said nut seated against the end of the body and adapted to draw the bar out of the body when the nut is threaded down the bar, the threaded bar having a head portion adapted to seat against the edge of the dashboard of the car and the other bar having a pocket at its lower end adapted to seat the hollow guide therein.

3. A dual driver control mechanism for automobiles comprising a hollow guide, a base adjacent to one end thereof, said base extending outwardly from each side of the hollow guide against the floor of the automobile, an upstanding frame mounted on the base, lever means mounted on said upstanding frame, pedal plates mounted on the lever means, flexible strands connected to said lever means adapted to move lengthwise of the hollow guide when the pedals are depressed, said strands passing into the hollow guide, through its length to positions near its opposite end and out of the hollow guide, clamps on the free ends of said flexible connectors for securing them to the clutch and brake pedals of the automobile, and means to secure each end of the hollow guide against the floor of the automobile.

4. A dual driver control mechanism for automobiles comprising a hollow guide, a base adjacent to one end of said hollow guide, said base extending outwardly from each side of the hollow guide against the floor of the car, an upstanding frame mounted on the base, lever means mounted on the frame, a pedal plate mounted on the lever means, a flexible strand having one end connected to the lever means, said lever means adapted to move the strand lengthwise of the hollow guide, when the pedal is depressed, said strand passing into the hollow guide, through the hollow guide to a position near its opposite end and out of the hollow guide, clamping means on the other end of the strand adapted to secure the strand to the brake pedal of the automobile, and means to secure the hollow guide to the floor of the automobile.

5. A dual driver control mechanism for automobiles comprising a hollow guide, a base adjacent to one end of said hollow guide, an upstanding frame mounted to the base, lever means pivotally mounted to the upstanding frame, said lever means each comprising a laterally extending arm pivoted at one end and having a depending arm connected to it at the pivot point, said laterally extending arms each having a pedal plate pivoted to its end opposite its pivot, means on each pedal plate adapted to maintain said plate in a horizontal position as the arm is swung down about its pivot, each depending arm having one end of a flexible connector attached to its lower end, said flexible connectors passing into the hollow guide, through the hollow guide to positions near its opposite end and out of the hollow guide, clamping means attached to the free ends of the flexible connectors for securing them to the clutch and brake pedals of the automobile, and means to secure the hollow guide to the floor of the automobile.

6. A dual driver control mechanism for automobiles comprising a hollow guide, a base adjacent one end of said hollow guide, upstanding frames mounted on the pipe section adjacent to said base, upwardly extending levers pivoted to said upstanding frames, depending links pivoted to the upper ends of said upwardly extending levers, pedal plates mounted on the upper ends of said depending links above their pivot points, rollers mounted at the lower ends of said depending links, said rollers being inside the hollow guide and adapted to move lengthwise in said hollow guide as the pedal plates are depressed, flexible strands attached to said depending links adjacent said rollers, said strands being pulled lengthwise of the hollow guide when said rollers are moved, said strands extending through the hollow guide to positions near its opposite ends and out of the hollow guide, clamping means on the free ends of said flexible strands for securing them to the clutch and brake pedals of the automobile, and means to secure the hollow guide to the floor of the automobile.

7. Dual driver control for clutch and brake mechanisms of an automobile adapted to be connected to the conventional clutch and brake of the automobile comprising an auxiliary clutch pedal and an auxiliary brake pedal, a support and spacing mechanism for said auxiliary pedals comprising a base portion resting on the floor of the automobile adjacent to the conventional clutch and brake pedals and another base portion resting on the floor adjacent to the side of the automobile most remote from the conventional clutch and brake pedals, the mechanism having pivotal supports thereon for the auxiliary pedals, an expansible jack extending from each of said portions upward and bearing against the automobile dash board to clamp said portions to the floor, and means carried by said mechanism operatively connecting the clutch pedals to each other and the brake pedals to each other.

8. Dual driver control for clutch and brake mechanisms of an automobile adapted to be connected to the conventional clutch and brake of the automobile comprising an auxiliary clutch pedal and an auxiliary brake pedal, a support and spacing mechanism for said auxiliary pedals comprising a base portion resting on the floor of the automobile adjacent to the conventional clutch and brake pedals and another base portion resting on the floor adjacent to the side of the automobile most remote from the conventional clutch and brake pedals, the mechanism having pivotal supports thereon for the auxiliary pedals, an expansible jack extending from each of said portions upward and bearing against the automobile dash board to clamp said portions to the floor, a rigid guide connecting said portions, a connecting member supported by said guide and connecting the clutch pedals to each other, and another connecting member supported by said guide connecting the brake pedals to each other.

References Cited in the file of this patent

UNITED STATES PATENTS

| | | |
|---|---|---|
| 1,752,501 | Myers | Apr. 1, 1930 |
| 2,589,975 | Sprinkel et al. | Mar. 18, 1952 |

FOREIGN PATENTS

| | | |
|---|---|---|
| 819,047 | Germany | Oct. 29, 1951 |